US009626885B1

(12) United States Patent
Alvarez

(10) Patent No.: US 9,626,885 B1
(45) Date of Patent: Apr. 18, 2017

(54) SECURE DOOR DISPLAY HOLDER AND PROTECTOR

(71) Applicant: Mariano Alvarez, Bakersfield, CA (US)

(72) Inventor: Mariano Alvarez, Bakersfield, CA (US)

( * ) Notice: Subject to any disclaimer, the term of this patent is extended or adjusted under 35 U.S.C. 154(b) by 0 days.

(21) Appl. No.: 14/705,154

(22) Filed: May 6, 2015

(51) Int. Cl.
*C09F 7/02* (2006.01)
*G09F 23/00* (2006.01)
*E06B 9/02* (2006.01)
*E06B 7/28* (2006.01)
*G09F 7/18* (2006.01)

(52) U.S. Cl.
CPC ................ *G09F 23/00* (2013.01); *E06B 7/28* (2013.01); *E06B 9/02* (2013.01); *G09F 7/18* (2013.01)

(58) Field of Classification Search
CPC ... E06B 7/28; E06B 9/02; G09F 23/00; G09F 7/18
USPC ........................................................ 40/611.01
See application file for complete search history.

(56) References Cited

U.S. PATENT DOCUMENTS 2,489,029 A * 11/1949 Guerrant ................ B65D 85/70 206/325
3,461,584 A * 8/1969 Wilson .................... G09F 21/04 40/591
5,123,223 A * 6/1992 Makarevich .......... B44C 5/0446 206/325
5,351,733 A * 10/1994 Ullman ..................... E06B 7/28 150/154
5,485,694 A * 1/1996 Goad ......................... G09F 7/18 40/606.07
5,555,659 A * 9/1996 Hade ................... G09F 15/0025 160/329
5,611,382 A * 3/1997 Sferra ....................... E06B 9/52 160/113
5,649,390 A * 7/1997 Davidson .................. B44C 5/00 160/179
5,943,803 A * 8/1999 Zinbarg .................. E06B 3/485 160/201
6,092,319 A * 7/2000 Hicks .................. G09F 15/0025 40/590
6,755,383 B2 * 6/2004 Davis .................... B60P 7/0823 248/354.7
7,198,835 B2 * 4/2007 Anderson .............. A47H 23/04 150/154
7,941,950 B2 * 5/2011 Leeds .................... G06Q 30/02 40/606.01
8,967,398 B2 * 3/2015 McLemore ............... E06B 3/34 211/113
2015/0269873 A1 * 9/2015 Rowe ........................ G09F 7/02 40/611.01

* cited by examiner

*Primary Examiner* — Shin Kim
(74) *Attorney, Agent, or Firm* — R. Scott Kimsey, Esq.; Klein DeNatale Goldner

(57) ABSTRACT

A device for protecting a door includes a body extending over at least a portion of the door and two inserts, extending from opposing edges of the body between the door and the door frame. A rod attached to the two inserts and extending therebetween contacts a surface of the door and secures the device thereto.

8 Claims, 8 Drawing Sheets

SECURE DOOR DISPLAY HOLDER AND PROTECTOR

RELATED APPLICATIONS

Not Applicable

FIELD AND BACKGROUND

1. Field

The present field relates generally to a display device for mounting on doors, and more specifically to a secure display device suitable for mounting on an existing door, providing protection to the door and against tampering with the device.

2. Background

Businesses are susceptible to various forms of vandalism, particularly those businesses located where people are likely to be found after business hours. Vandalism may take the form of physical destruction of property, such as signs or displays affixed to the exterior of the business' door. In other instances, particularly with respect to businesses located near bar and restaurants, the vandalism may take the form of public urination at or near the door to the business. This is a particular problem for businesses having doors set away from the sidewalk or otherwise offering some protection against observation. Inebriated patrons of a bar may, for example, use the relative seclusion of the doorway as a safe place for urination. Not only does this cause a problem for the exterior of the business, but with many businesses the urine is able to penetrate the area between the door and the doorjamb to the interior of the business.

SUMMARY

Provided is a secure door display suitable for mounting on a standard metal or wooden door, the door display having a shield to discourage public urination in the vicinity of the door and to protect the door and business from the same.

The door display holder and protector is preferably made from lightweight material and adapted for easy installation on an existing door. The device can be used on any external door of a commercial business, and is designed for easy cleaning when necessary. The device protects metal doors against corrosion caused by urination at or near the door, as well as from the elements.

The present device also provides a secure display holder suitable for displays of various sizes. The device is made secure by an interior fastening mechanism not accessible from the exterior of the door. The secure nature of the device makes tampering with or removing the device from the door difficult, providing advantages over traditional signage or other notices affixed to the exterior of a door.

DETAILED DESCRIPTION

Figure 1:
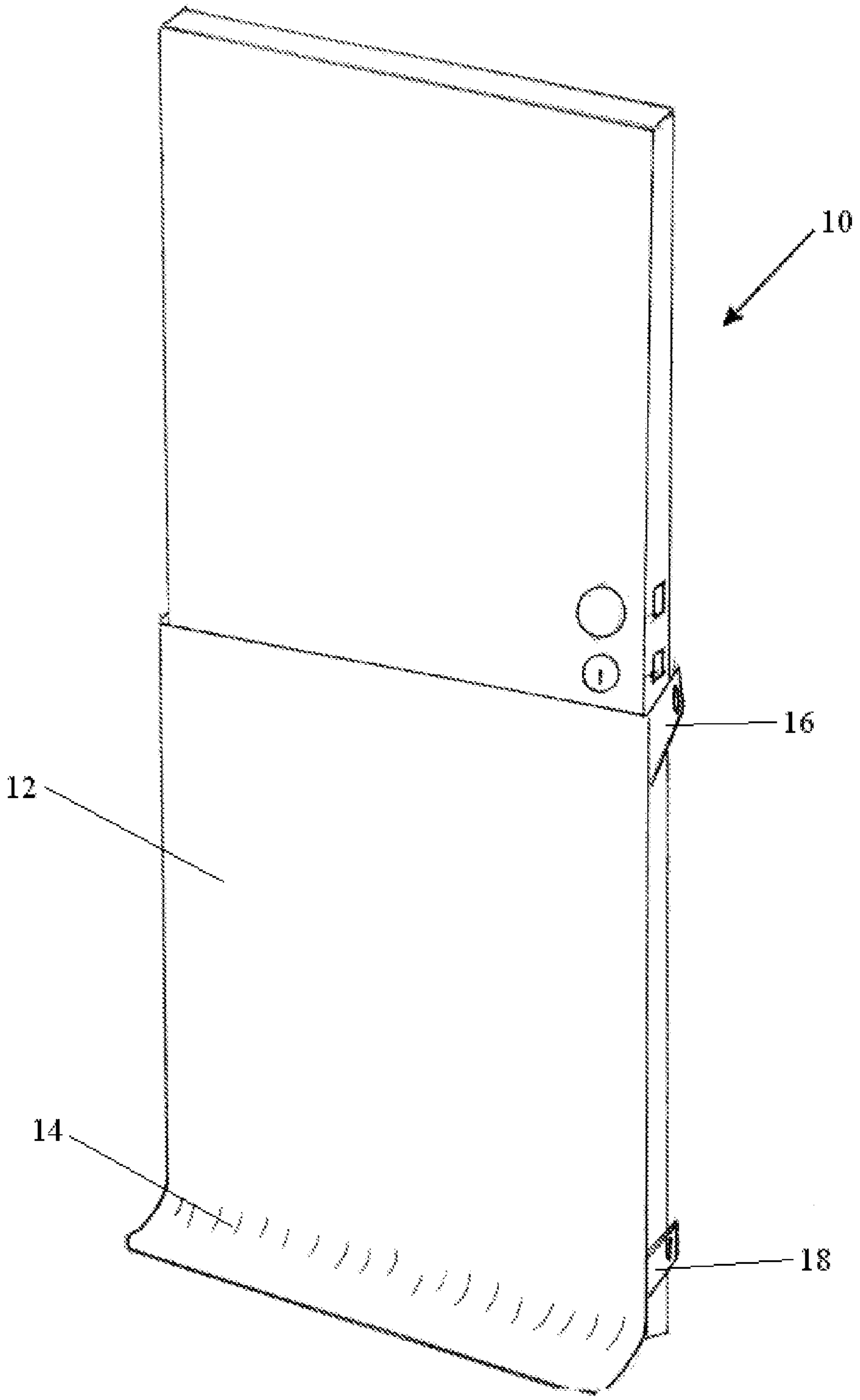
FIG. 1 is a front perspective view of a door having one embodiment of a door protector device affixed thereto.

The present secure display holder and protector (referred to hereinafter as the "device" or the "door protector," for example) is suitable for use with a variety of doors, including metal doors, glass doors, metal screen doors, and wooden doors. The device may, in fact, be used with any suitable door. The device is preferably constructed of a light-weight material such as aluminum or a strong, hard synthetic polymer. Any suitable materials may, however, be used for the present device and any of its component parts.

One embodiment of the device is constructed of a thin, flat portion of metal that covers the lower part of the outside of a door, from the door knob and deadbolt area to the bottom of the door, and from one side of the door to the other. The lower portion of the device is preferably curved outward, away from the door, to form a ramp-like structure that prevents fluids from seeping under the door and also tends to repel urine, for example, back toward a person urinating near the door, thereby discouraging urination at or near the door.

The protector may be secured to the door using four inserts that go between the door and the door frame. The inserts are preferably formed integrally with the door protector and extend therefrom, though the inserts may also be mechanically fastened to the door protector or, in the case of a metal door protector, welded thereto. The end of the inserts that extend into the interior of the business include openings defined therein suitable for receiving a long screw or rod having a threaded portion at at least one end thereof. The door protector may also be held in place by a screw extending through the opening in the insert, the screw securing an L-shaped spacer to the insert, the L-shaped spacer contacting the back of the door securely.

In some embodiments of the device, the inserts may wrap around the door rather than only extending from the front of the door past the rear thereof. Such inserts may be held in place with one or more small screws and a nut.

The front portion of the door protector preferably includes a frame holder with three sides that are channeled, such as in a C or U shape, and that includes a brace along the rear of the door. The channel formed by the three sides of the frame holder is configured to hold signage, any be made of a variety of suitable materials, including plexiglass or other synthetic polymers, wood, chipboard, metals, and the like. In one embodiment of the device, the channels are approximately ½ inch in width and ½ inch in depth.

Some embodiments of the present device may include the frame holder as well as the curved door protector at the lower portion thereof, and some embodiments may include only the door protector or only the secure frame holder. In each embodiments, the various ways in which the device may be secured to the door are the same. Each of the various embodiments has the advantage of fitting tight against the door, covering a large area of the door and providing protection thereto, providing a professional appearance whether used with or without signage or other displays, and can be modified to fit the dimensions of any given door.

Turning to the drawings, wherein like numerals indicate like parts, FIG. 1 is a perspective view of a conventional door 10 with one embodiment of a door protector 12 associated therewith. As shown in the figure, door protector 12 includes a curved or ramp bottom portion 14 designed to repel water, urine, or other fluids. First insert 16 and second insert 18 are visible, extending from the door protector along the edge of the door and projecting beyond the rear thereof.

Figure 2:
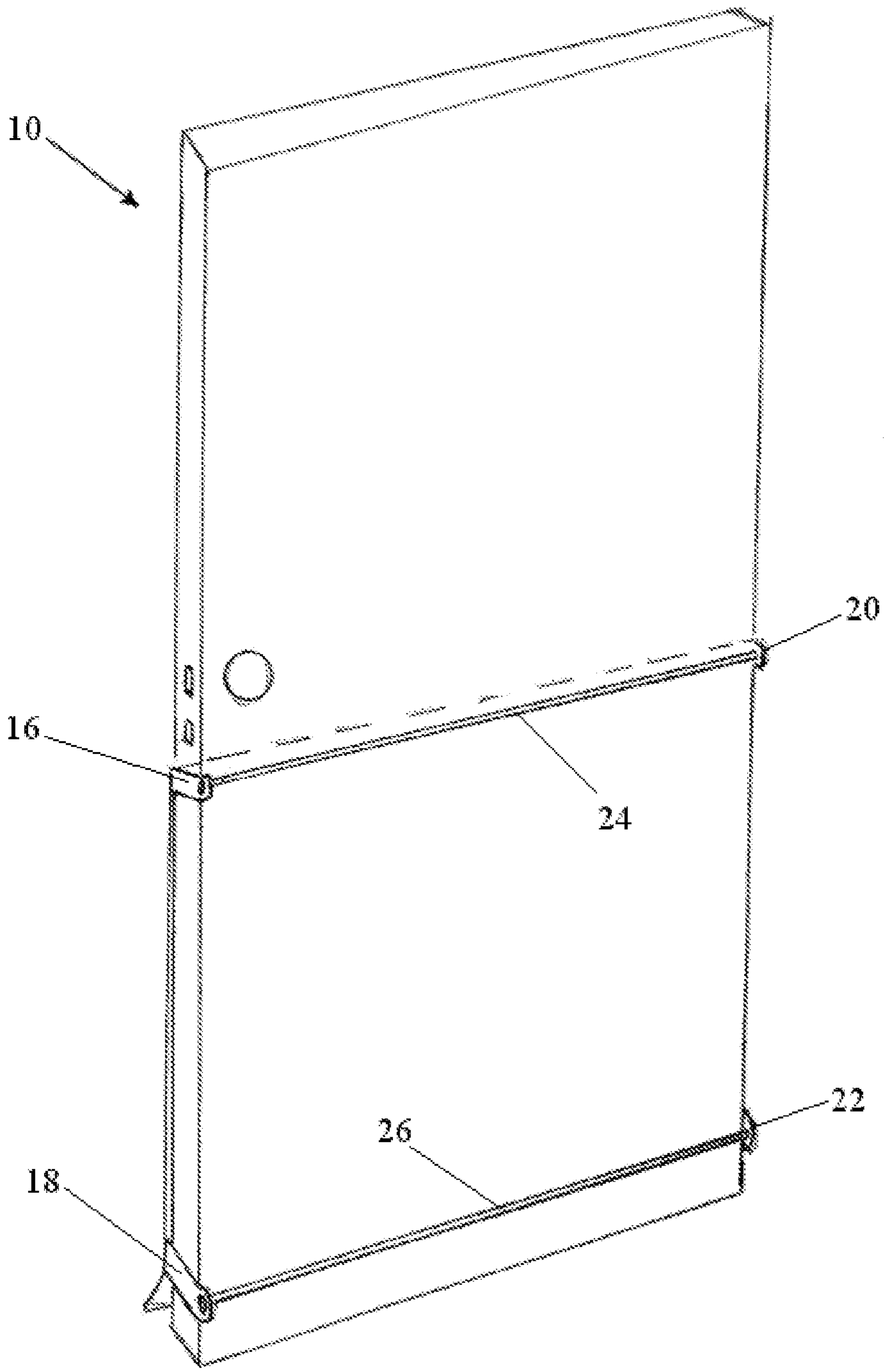
FIG. 2 is a rear perspective view of the door and device of FIG. 1.

FIG. 2 is a perspective view of the rear of door 10 in FIG. 1, with door protector 12 attached thereto. As can be seen in the figure, third insert 20 and fourth insert 22 also extend from door protector 12 beyond the rear of the door. The various door protectors includes openings in the ends thereof that extend beyond the rear of the door. In the embodiment of the door protector shown in FIG. 2, a first rod 24 extends between first insert 16 and third insert 20, and a second rod 26 extends between second insert 18 and fourth insert 22. The thin rods may include a flattened portion at one end, to prevent the end of the rod passing through the opening in the respective insert, and may include a threaded portion at the other end such that the rod can be secured in place with a butterfly nut or other fastener made up to the threads of the rod and secured firmly against the respective insert.

Figure 3:
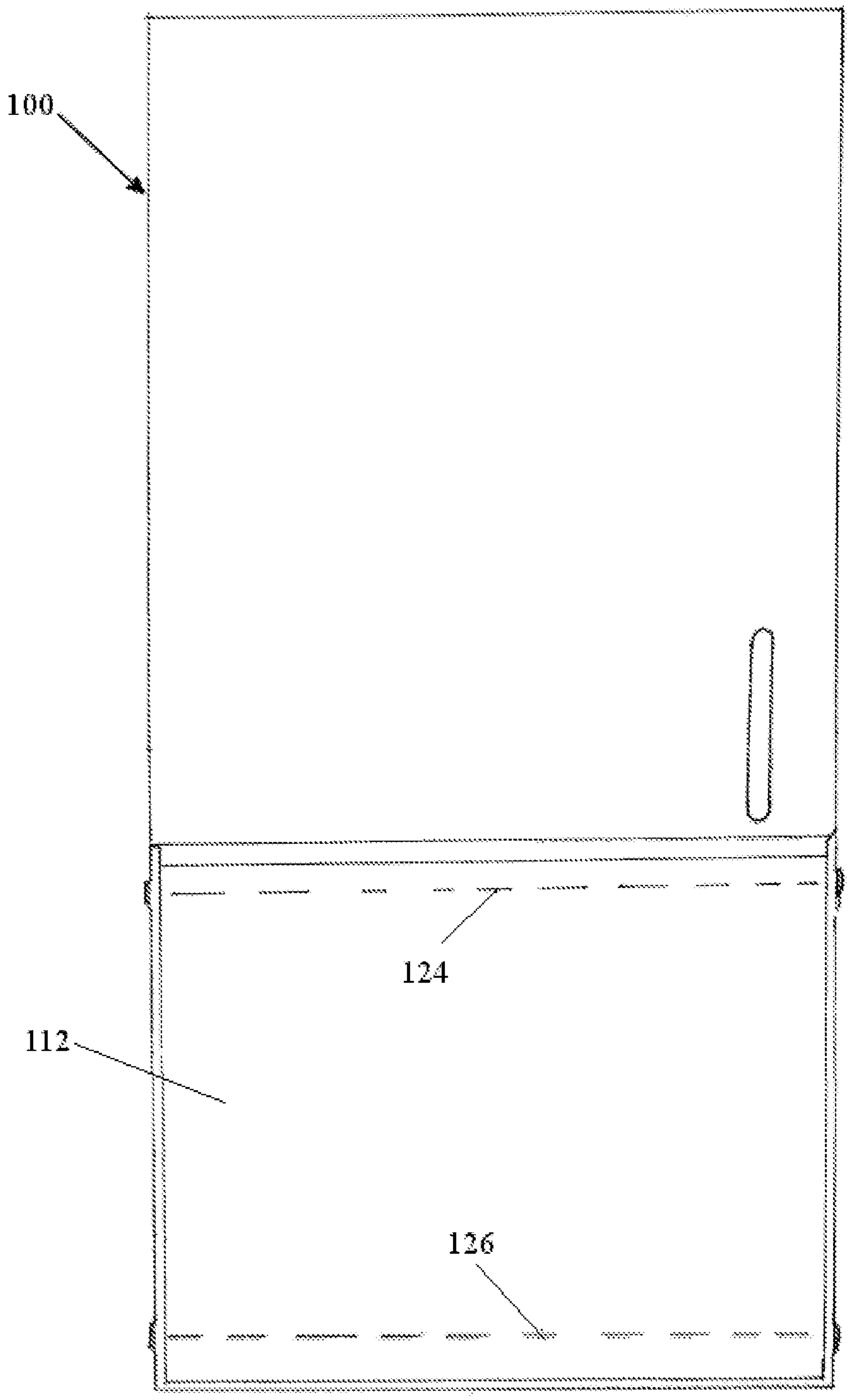
FIG. 3 is a front view of a door having one alternative embodiment of a door protector device affixed thereto.
Figure 4:
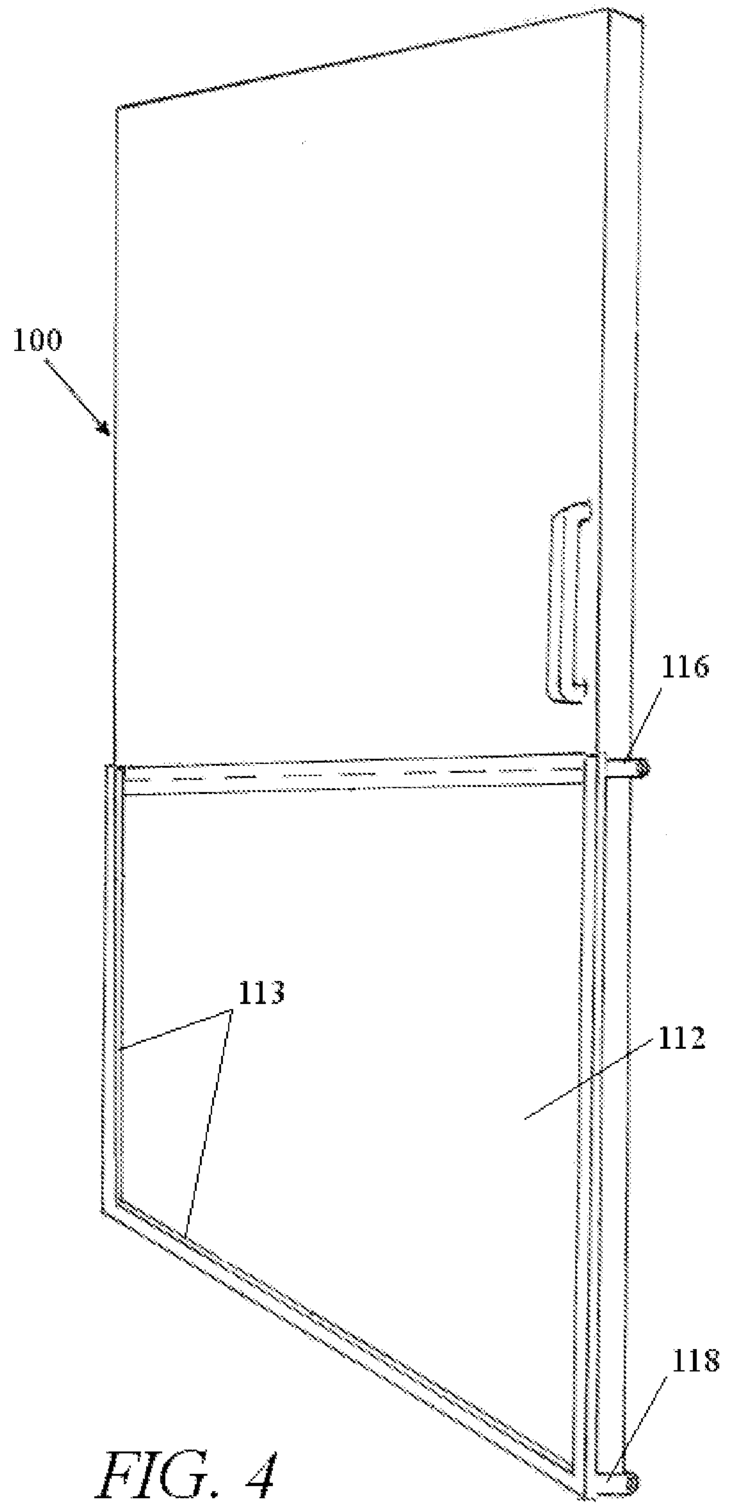
FIG. 4 is a front and side perspective view of the door and device of FIG. 3.

FIG. 3 provides front view of a conventional door 100 having a door protector 112 affixed thereto, the door protector 112 formed as a frame holder for displaying signage or other materials. The embodiment of door protector 112 shown in FIG. 3 does not include a curved or ramped portion to repel fluid, though it is contemplated that such a curved or ramped portion may be provided. As shown in FIG. 4, door protector 112 affixes to door 100 in the same manner as door protector 12, above, with first and second inserts 116 and 118 shown. Dashed lines in FIG. 3 indicate the position of first rod 124 and second rod 126, which extend behind door 100.

Figure 5:
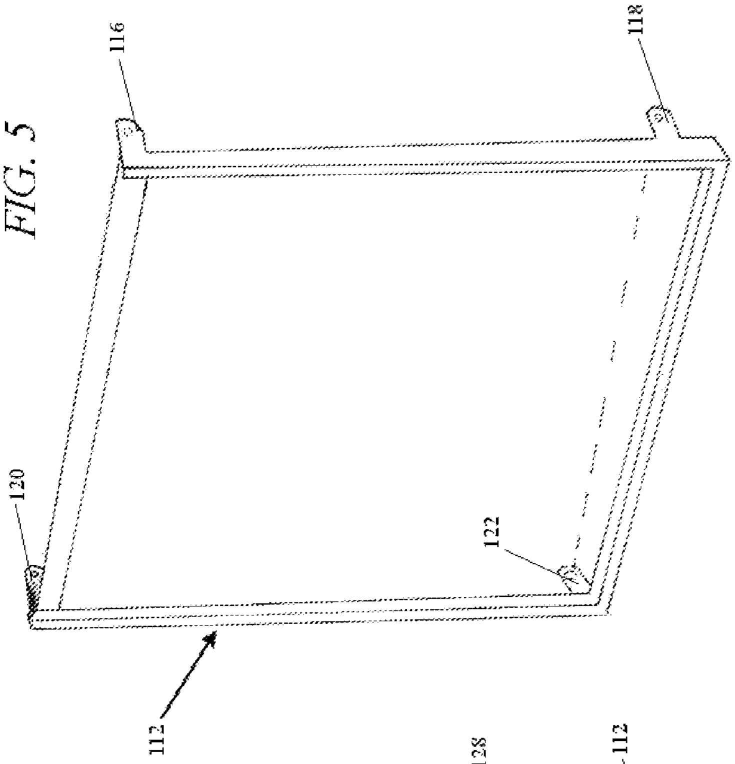
FIG. 5 is a perspective view of the door protector device of FIGS. 3 and 4.
Figure 5A:
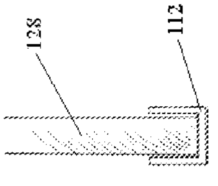
FIG. 5A is a cross-section view of the door protector device of FIGS. 3 through 5 showing a channel formed by the device and having a sign held therein.

FIG. 5 depicts door protector 112 detached from a door, rendering the various inserts, as well as the nature of the frame, more visible. FIG. 5A is a cross-section view of a sign 128 positioned within a C channel created by door protector 112.

Figure 6:
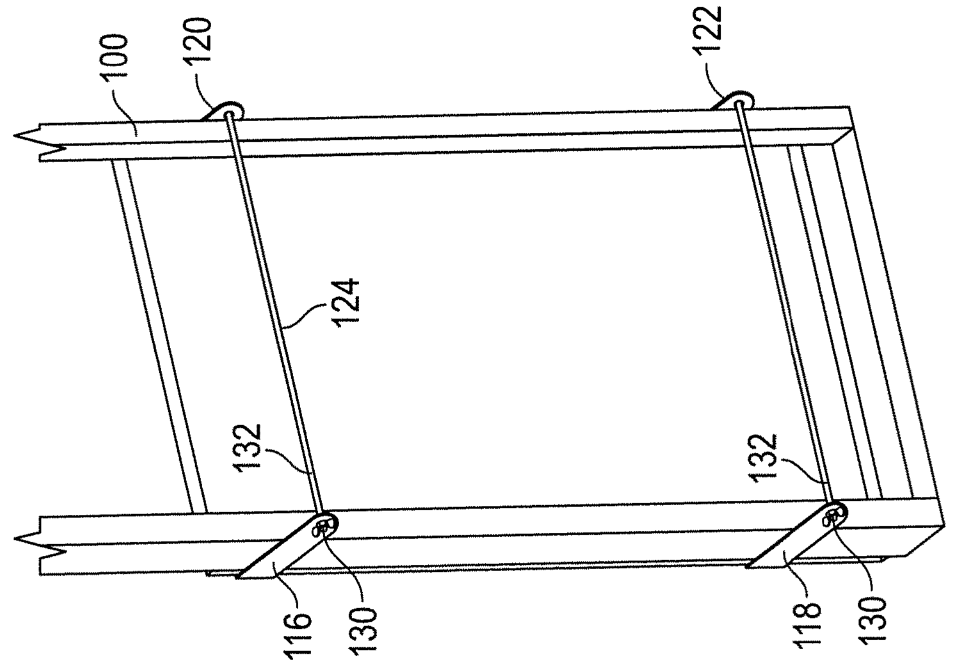
FIG. 6 is a close view of a rod and nut attachment embodiment suitable for use with various embodiments of the present device.

FIG. 6 is a closer rear view of door protector 112 attached to a door 100. The view shows more clearly inserts 116, 118, 120, and 122. First rod 124 extends from first insert 116 to third insert 120, and second rod 126 extends from second insert 118 to fourth insert 122. Both rods include a threaded portion 132 to which butterfly nut 130 is made up, securing the respective rod in place. The end of the rod not having the threaded portion is preferably flattened or otherwise sized or shaped so as to be incapable of passing through the opening in the insert.

Figure 7:
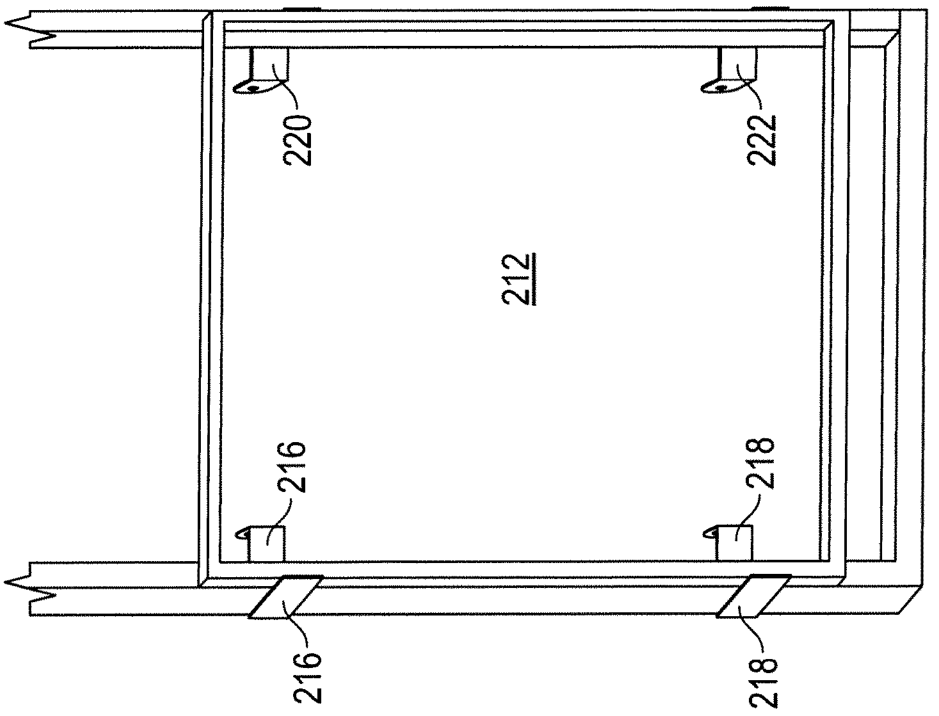
FIG. 7 is a perspective view of one alternative embodiment of a door protector device.

FIG. 7 depicts an alternative arrangement of the present device wherein the door protector includes a frame holder for holding signage, for example, and is secured to a door using a screw/spacer/nut combination rather than the mechanisms described above.

Figure 8:
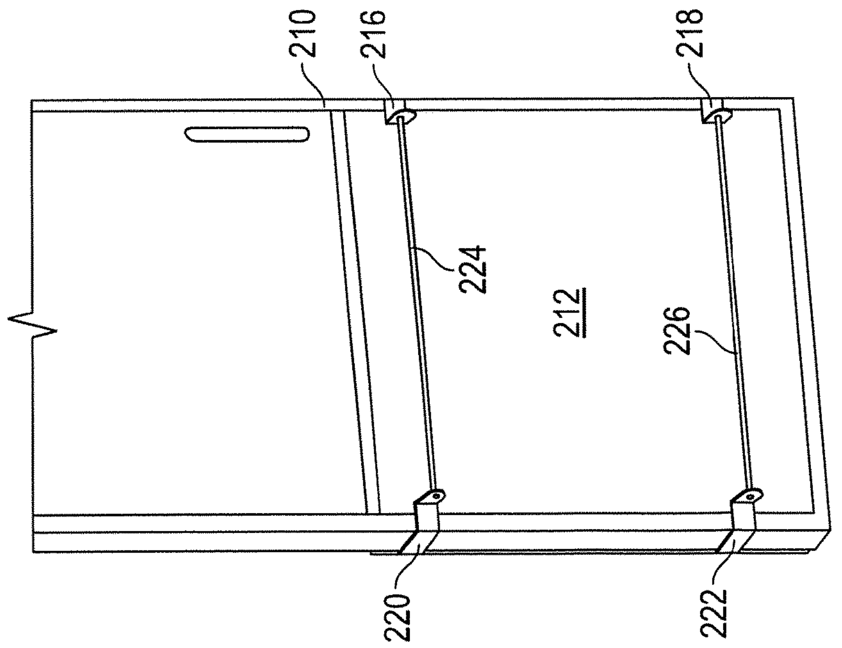
FIG. 8 is a rear view of the door protector device of FIG. 7.

FIG. 8 is a rear view of the embodiment shown in FIG. 7, and provides a detailed view of the screw/spacer/nut arrangement, as well as the relation of the insert to the door.

Figure 9:
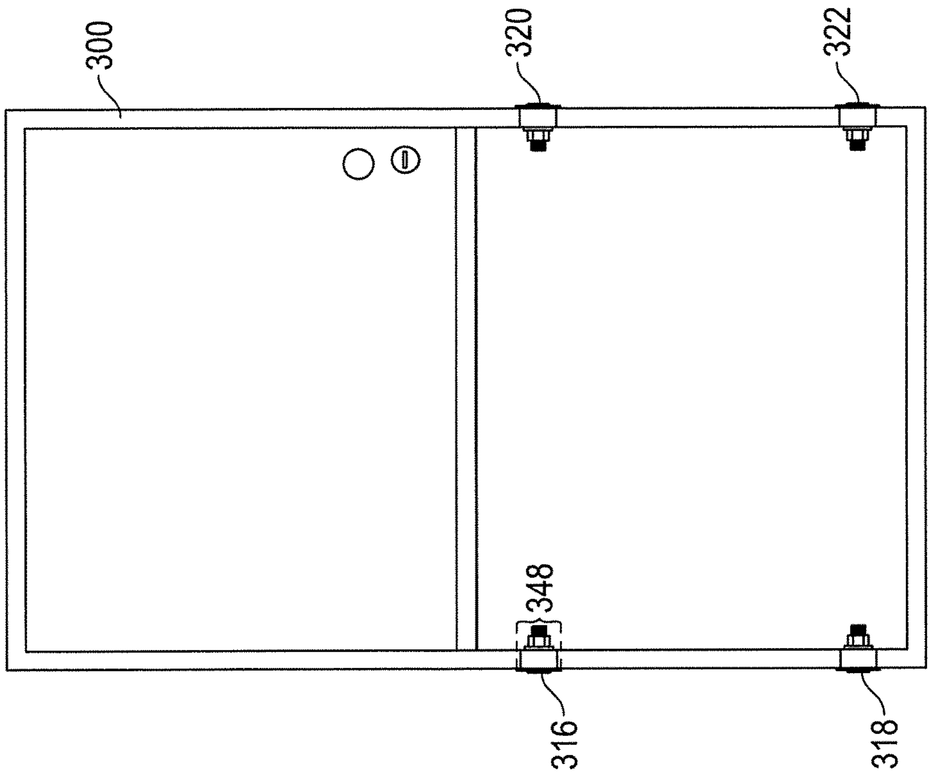
FIG. 9 is a rear view of an embodiment of the present device wherein the display holder is positioned on a door and held in place via a nut and screw with a spacer and insert.
Figure 9A:
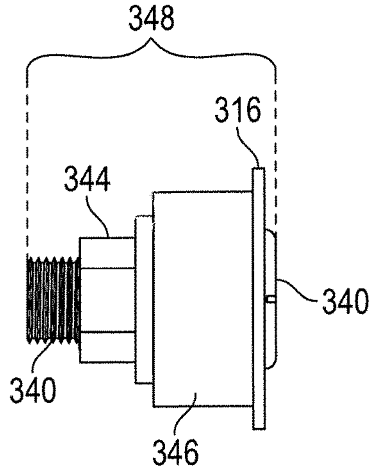
FIG. 9A is a close view of a screw, nut, and insert combination of the embodiment of the present device shown in FIG. 9.
Figure 9B:
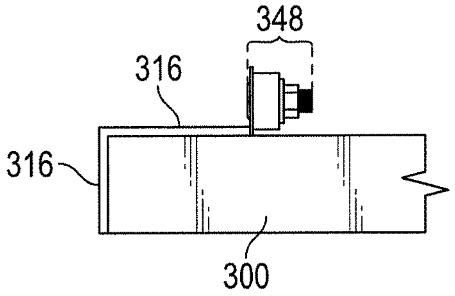
FIG. 9B is a close top view of an embodiment of the present device shown in FIG. 9 with the screw, nut, and insert combination displaced toward the interior of the door.

FIG. 9 depicts an embodiment of the present device wherein the display holder is positioned on an interior surface of the door. A nut and screw with a space and insert hold the device firm against the door. FIG. 9A shows a close view of nut 344, screw 340, insert 316, and spacer 346, altogether an assembly 348. FIG. 9B shows an embodiment of the present device utilizing assembly 348, with insert 316 elongated to move assembly 348 toward the interior of door 300.

As shown in FIGS. 9 through 9B, portions of the device extend between the door and jamb to secure the device to a conventional or existing door. These portions are minimal and do not allow for tampering with the device or any display contained therein.

Figure 10:
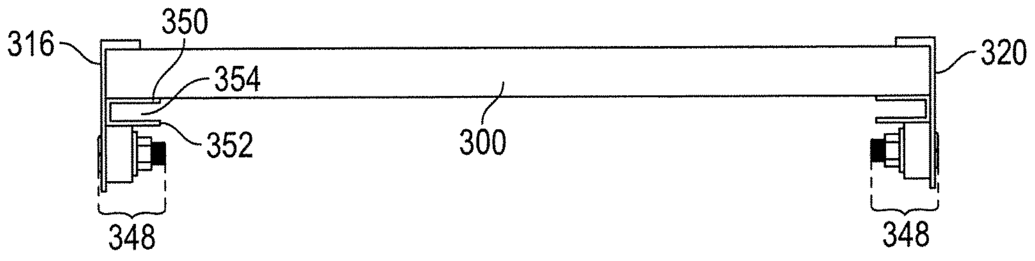
FIG. 10 is a top view of an embodiment of the present device shown in FIG. 9.

FIG. 10 is a top view of a door having the embodiment of the present device of FIG. 9 installed thereon. The mechanism by which the device is secured to the door is shown, as is the display holder portion for inserting a sign or other display or indicia therein.

It is contemplated that while the various embodiments shown and described herein depicts a device that extends from the door knob to the lower portion of the door, any desired portion of the door may be covered, including the portion extending from the door know to the upper portion of the door.

Having thus described the preferred embodiment of the invention, what is claimed as new and desired to be protected by Letters Patent includes the following:

1. A device for protecting a door, the door set in a door frame, the device comprising:

a body extending over at least a portion of the exterior surface of the door, the body comprising a top edge, a bottom edge, a first side edge and a second, opposing side edge;

a first insert extending from the first side edge and configured to extend between the door and the door frame associated with said door;

a second insert extending from the second side edge and configured to extend between the door and the door frame;

a rod attached to the first insert and the second insert, and extending therebetween against an interior surface of the door, wherein the body comprises an outwardly-curving portion positioned substantially at the bottom of said door.

2. The device according to claim 1 wherein said body extends from substantially at a door knob of the door to a bottom of said door.

3. The device according to claim 1 wherein the body extends from substantially at a door knob of the door to a bottom of said door.

4. The device according to claim 1 wherein the body is adapted to removably receive signage or other written indicia.

5. The device according to claim 4 wherein the body comprising a channel into which an object may be insert for display within said device.

6. A device for protecting a door, the door set in a door frame, the device comprising:

a body extending over at least a portion of the exterior surface of the door, the body comprising a top edge, a bottom edge, a first side edge and a second, opposing side edge;

a first insert extending from the first side edge and configured to extend between the door and the door frame associated with said door;

a second insert extending from the second side edge and configured to extend between the door and the door frame;

a rod attached to the first insert and the second insert, and extending therebetween against an interior surface of the door;

a third insert extending from the first side edge and configured to extend between the door and door frame;

a fourth insert extending from the second side edge and configured to extend between the door and the door frame; and a second rod attached to the third insert and the fourth insert and extending therebetween against an interior surface of the door.

7. A device for protecting a door, the door set in a door frame, the device comprising:

a body extending over at least a portion of a first surface of the door, the body comprising a first side edge and a second opposing side edge, the body further defining a display-receiving space therein, the display-receiving space configured to removably receive signage or other indicia such that the signage or other indicia is visible through the body, the body comprising an outwardly-curving portion positioned substantially at the bottom of said door;

a first insert extending from the first side edge and configured to extend between the door and the door frame;

a second insert extending from the second side edge and configured to extend between the door and the door frame; and an attachment attached to at least one of said first insert or second insert, the attachment engaging a second surface of said door, the second surface of said door being the surface opposite the first surface of said door.

8. The device according to claim 7, wherein the body extends from substantially at a door knob of the door to a bottom of the door.

* * * * *